July 7, 1953 W. L. SPRINGER 2,644,567
FOOD SERVICE CONVEYER
Original Filed Nov. 14, 1945 3 Sheets-Sheet 1
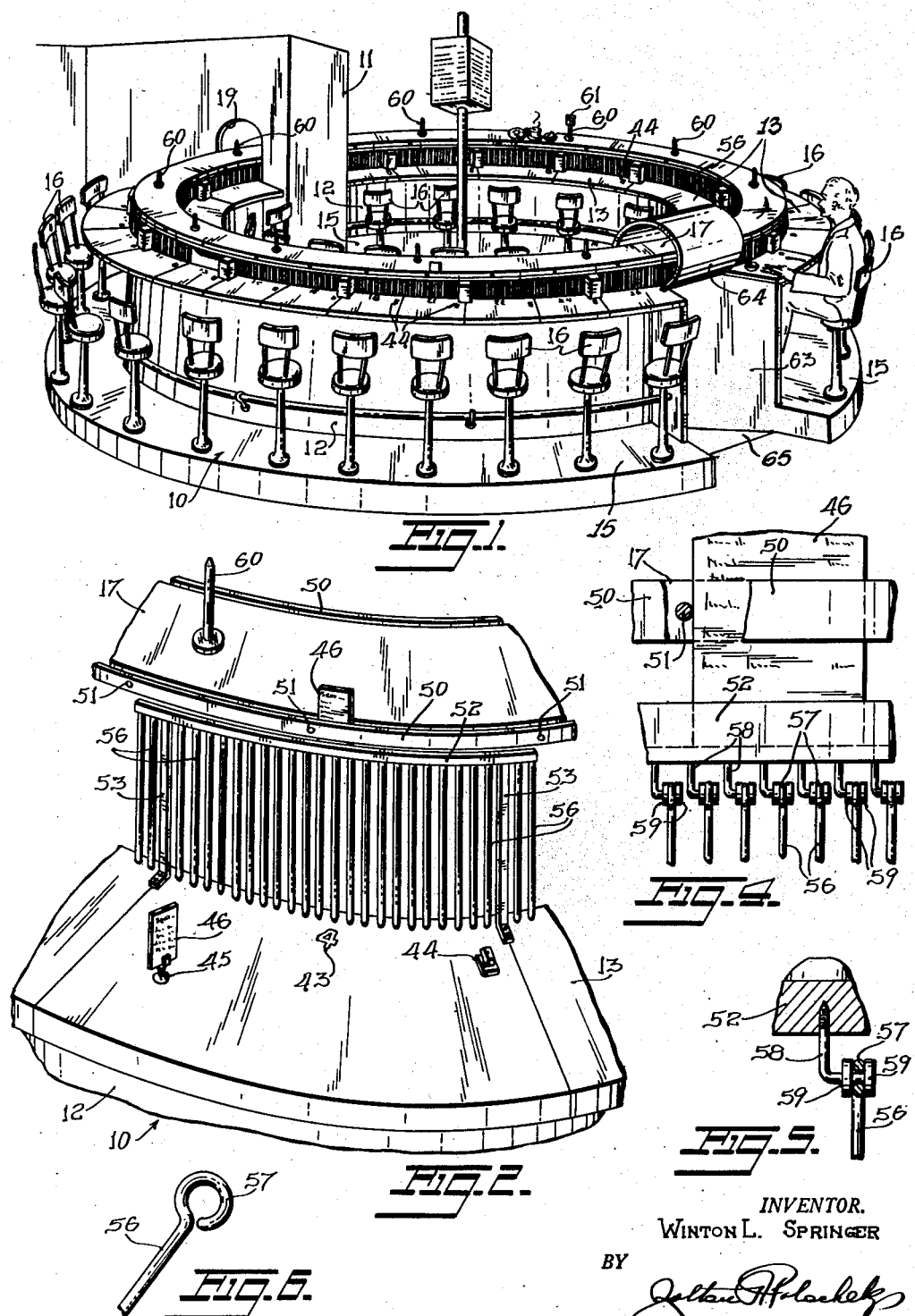
INVENTOR.
WINTON L. SPRINGER
BY
ATTORNEY July 7, 1953 W. L. SPRINGER 2,644,567
FOOD SERVICE CONVEYER
Original Filed Nov. 14, 1945 3 Sheets-Sheet 2
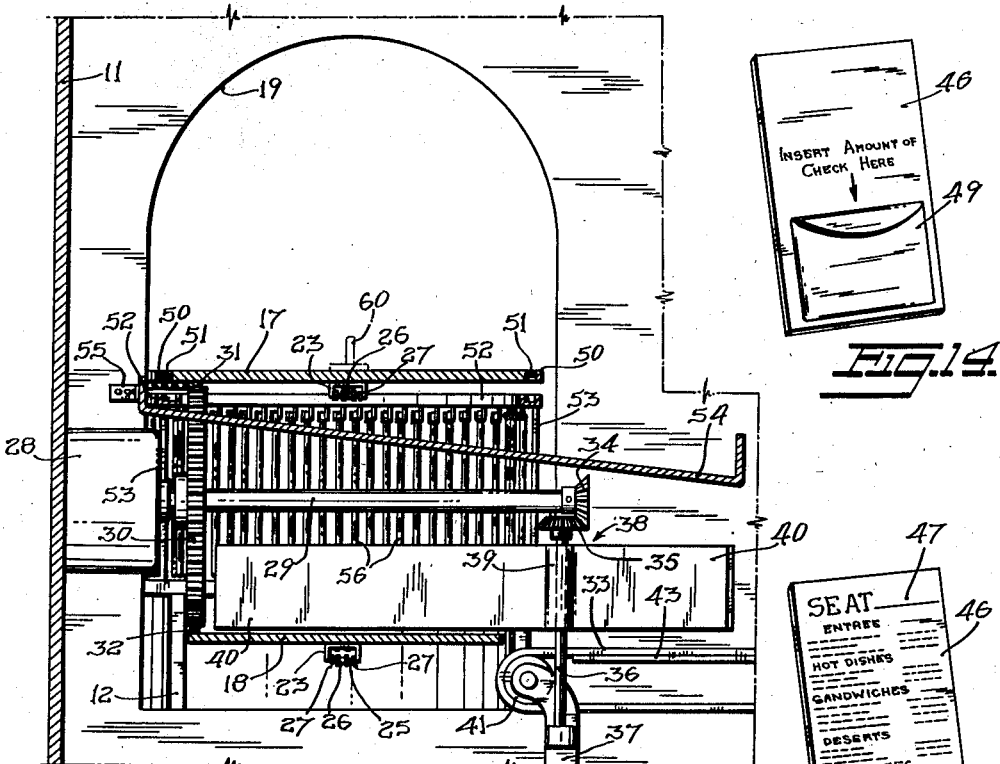
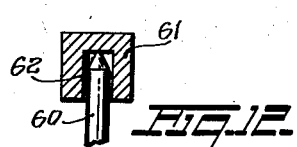
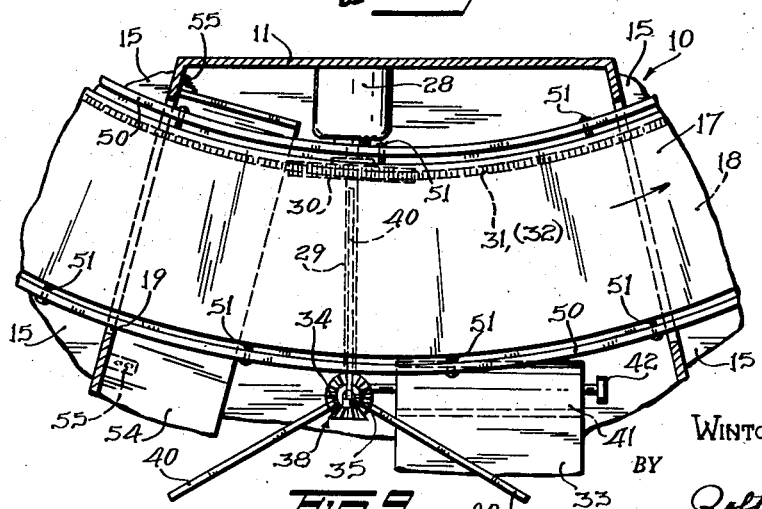
INVENTOR.
WINTON L. SPRINGER
BY
ATTORNEY July 7, 1953
W. L. SPRINGER
2,644,567
FOOD SERVICE CONVEYER
Original Filed Nov. 14, 1945
3 Sheets-Sheet 3
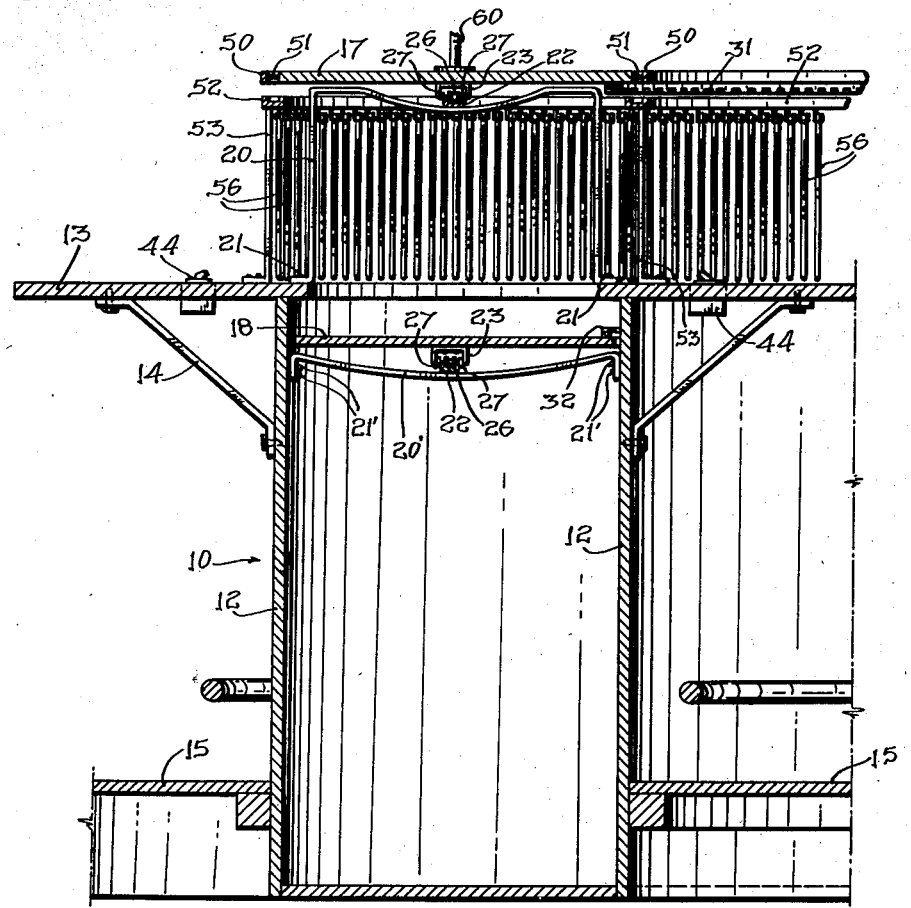
Fig. 3
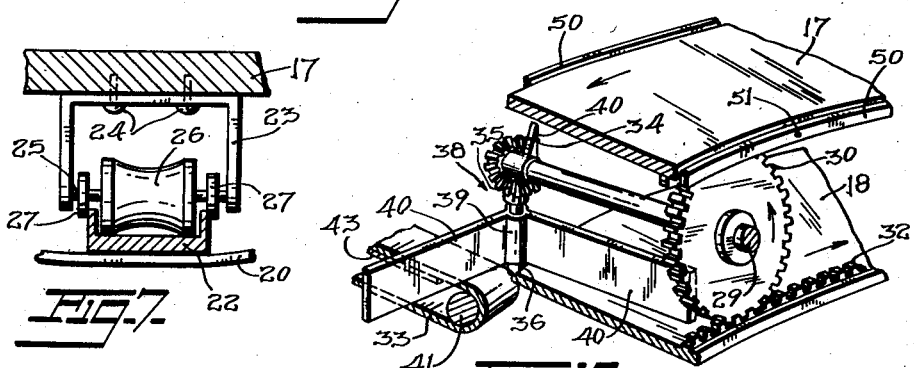
Fig. 7
Fig. 10
INVENTOR.
WINTON L. SPRINGER
BY
ATTORNEY Patented July 7, 1953

2,644,567

UNITED STATES PATENT OFFICE 2,644,567

FOOD SERVICE CONVEYER

Winton L. Springer, New York, N. Y.

Substituted for abandoned application Serial No. 628,537, November 14, 1945. This application August 24, 1948, Serial No. 45,900

4 Claims. (Cl. 198—25)

This invention relates to food servers and conveyors and more particularly to a restaurant table or counter equipped with rotary service conveyors.

The present application is a substitute for my earlier abandoned application, Serial No. 628,537 filed November 14, 1945.

In present day restaurant and cafeteria arrangements much valuable space is not utilized to the best advantage, as considerable space is taken up by the arrangement of the tables with large non-productive aisles therebetween and considerable monies are expended in waiters who serve the food and/or bus people who gather the soiled dishes and eating utensils.

The present invention proposes a novel restaurant table or counter about which the guests sit eliminating the necessity of aisles and which has separate conveyors, one for delivering the guest's order and the other for taking away the soiled dishes and eating utensils eliminating the necessity for waiters and/or bus people.

The invention further proposes arranging the conveyors one above another in a manner to be rotated in opposite directions by a single electric motor or other propulsion means.

Still another object of the present invention proposes using the lower of the two conveyors for carrying away the soiled dishes and eating utensils with the provision of a novel portière arranged in a manner to hide from view the dishes moving with the conveyor.

Another object of the present invention proposes passing the conveyors through a serving booth or kitchen where an attendant receives the guest's order and fills the same by placing the requested foods on the top conveyor to be carried to the guest.

Still further the present invention proposes novel mechanism with the serving booth or kitchen arranged to sweep the soiled dishes and utensils off the lower conveyor onto an endless belt in a manner to be carried to a dishwashing station.

It is another object of the present invention to construct the table or counter in the form of a complete circle and to arrange seating stools on the inner and outer periphery of the complete circle in order to accommodate a greater number of guests.

Still another object of the present invention proposes providing an underpass at one area of the counter or table in a manner to permit guests to pass beneath the table to be seated on the inner periphery of the complete circle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the restaurant table or conveyor constructed in accordance with the present invention.

Fig. 2 is an enlarged detailed perspective view of a portion of Fig. 1.

Fig. 3 is a vertical sectional view of the table or conveyor.

Fig. 4 is an elevational view of a portion of Fig. 2 having portions thereof broken away to reveal underneath construction.

Fig. 5 is an enlarged partial vertical sectional view of a portion of one of the portière members.

Fig. 6 is an enlarged perspective view of one of the portière members.

Fig. 7 is an enlarged detailed view of a portion of Fig. 3 illustrating the method of rotatively supporting the conveyors.

Fig. 8 is a vertical sectional view of the conveyors where they pass within the serving booth or kitchen.

Fig. 9 is a plan view of Fig. 8.

Fig. 10 is a sectional perspective view of a portion of the driving mechanism for the conveyors.

Fig. 11 is a perspective view of the standard of the top conveyor having a seat number indicator in position thereon.

Fig. 12 is a vertical sectional view of the top portion of Fig. 11.

Fig. 13 is a perspective view of the guest's order card showing the face thereof.

Fig. 14 is a perspective view similar to Fig. 13 but showing the reverse side of the guest's order card.

Referring now to the drawings, the food server and conveyor according to the present invention includes a circular counter having a circular base 10 extended from side to side of a protruding serving booth or portion of the kitchen 11. The base 10 comprises vertical inner and outer side walls 12 from the top end of which inner and outer table portions or counters 13 extend. The table portions or counters 13 extend radially inward and outward from the side walls 12 and have their adjacent inner and outer edges secured to the top edge of the side walls 12. Diagonal braces 14 are arranged at spaced points about the base 10 and extend between the side walls 12 and the bottom faces of the table portion or counters 13 for assisting in supporting the same.

A circular platform 15 is formed on the inner and outer sides of the base 10 and stools 16, upon which guests are to be seated to eat from the table portions or counters 13 (see Fig. 1), are mounted on the platforms 15.

Supported by the circular base, between the inner and outer table portions or counters 13, there are superimposed conveyors, a top fresh food conveyor 17 and a bottom conveyor 18 for soiled dishes and utensils. The conveyors 17 and 18 are continuous and arranged one above the other and pass through openings 19 into and out of the serving booth or kitchen 11.

Means is provided for rotatively supporting the conveyors 17 and 18 to be rotated in opposite directions, as will hereinafter be described. The means for each of the conveyors is substantially alike and the support for the top conveyor 17 will be described in detail. At spaced points beneath the top conveyor 17 there are inverted U-shaped brackets 20, which have the free ends of their arms mounted on the top face of the table portions or counters 13 by means of screws 21. The intermediate arms of the inverted U-shaped brackets 20 carry a circular track 22 which extends from one side of the serving booth or kitchen 11 to the other. Spaced brackets 23 are mounted on the bottom face of the top conveyor 17 by means of screws 24 and rotatively support shafts 25. The track 22 is channel-shaped and mounted on the U-shaped brackets 20. Intermediate of their ends are rollers 26 which engage in the channel-shaped track 22. Also mounted on the shafts 25, there are guide rollers 27 which engage the sides of the channel-shaped track 22. The rollers 26 are provided at spaced points along the bottom face of the top conveyor 17 and all cooperate to rotatively support the top conveyor.

The rotative support for the bottom conveyor 18 is substantially the same as that described for the top conveyor 17, as previously indicated, except that the brackets 20' for the lower channel-shaped track 22 are substantially straight and have their ends attached to the inside faces of the side walls 12 by means of screws 21'.

Within the serving booth or kitchen 11, means is provided for rotating the conveyors 17 and 18 in opposite directions. This rotating means comprises an electric motor 28 mounted on the inner wall of the serving booth or kitchen 11 and having a projecting shaft 29 upon which a large gear 30 is mounted. The gear 30 meshes with a continuous circular rack 31 formed on the bottom face of the top conveyor 17 and with a continuous circular rack 32 formed on the top face of the bottom conveyor 18. Thus, when the electric motor is operating, the gear 30 will be turned to in turn rotate the conveyors 17 and 18 in opposite directions.

Also operated by the motor 28 is mechanism for sweeping the soiled dishes and utensils off the lower conveyor 18 onto an adjacent moving belt 33 for conveying the soiled dishes and utensils to a washing station, not shown on the drawings. This means includes a bevel gear 34 on an extended end of the shaft 29 which meshes with a second bevel gear 35 mounted on a vertical shaft 36 rotatively supported in a bracket 37 extending from the floor. A sweeper member 38 is mounted on the vertical shaft to rotate therewith across the top of the bottom conveyor 18. The sweeper member 38 comprises a hub 39 fixed to the vertical shaft 36 and radially extending sweeper blades 40 extending from the hub 39 to move across the top face of the bottom conveyor 18.

The moving belt 33 extends radially from one side of the bottom conveyor 18 and engages over a roller 41 supported at one end by the fixed bracket 37 and at the other end by another bracket 42 extending up from the floor. The top run of the moving belt 33 is supported by a fixedly mounted shelf member 43 and moves across the face thereof. It is understood that the moving belt 33 moves at a rate faster than the bottom conveyor 18 so that the soiled dishes and utensils will be carried away from the sweeper blades 40 of the sweeper member 38, before the blades have an opportunity to sweep the soiled dishes and utensils onto the floor. If desired, stationary walls or guides may be provided at the back of the conveyor 18 and the adjacent sides of the conveyor and the moving belt 33 for guiding movement of the soiled dishes and utensils from the bottom conveyor 18 to the moving belt 33.

The table portions or counters 13 are divided into separate eating areas designated by the seating numbers 43, see Fig. 2. Each seating area also includes a switch 44 which can be operated at the discretion of the guest for stopping rotation of the conveyors 17 and 18 and especially the top conveyor to facilitate removal of the food articles therefrom. The switches 44 are all mounted in series in a circuit which includes the motor 28 for stopping the operation of the motor when anyone of the switches 44 is open.

A bracket 45 is rested on the top face of the table portion or counter 13 within each eating area for supporting a menu card 46. Details of the face side of the menu card 46 are given in Fig. 13. At the top the menu card 46 includes a space 47 for indicating the seat number of the guest using the card. Below the space for indicating the seat number, the menu for the day is set forth together with the price of the various articles and a place to indicate which food articles are desired. The guest then totals the amount of the food articles chosen in the space 48 at the bottom of the face side of the card, and then places his money in payment for the chosen food articles in the small transparent envelope 49 provided for this purpose on the reverse side of the menu card 46, as shown in Fig. 14.

The top conveyor 17 is provided with a means for carrying a filled-in menu card 46 to the interior of the serving booth or kitchen 11, and this means comprises strips 50 mounted on the inner and outer edges of the top conveyor 17 by means of pins 51. The pins 51 also act to support the strips 50 in a position spaced from the adjacent edges of the conveyor 17 providing a space therebetween into which the menu card 46 may be inserted. Fixedly mounted beneath the spaces between the edges of the conveyor 17 and the strips 50 are channel-shaped receiving members 52 supported by brackets 53 extending vertically from the table portions or counters 13. The channel-shaped receiving members 52 extend from one wall to the other wall of the serving booth or kitchen 11 and do not enter the serving booth or kitchen.

When a menu card 46 is inserted in the space between the top conveyor 17 and one of the strips 50, the bottom edge will be engaged in the receiving member 52 therebeneath and be supported thereby. As the top conveyor 17 rotates, one of the supporting pins 51 will strike one edge of the menu card 46 as shown in Fig. 4, to push the menu card toward the serving booth or kitchen 11. As the receiving members 52 do not extend into the serving booth or kitchen, the menu cards 46 will slide down from between the conveyor 17 and the strips 50 when they enter the serving booth or kitchen, and be gathered in an appropriate chute 54 and collect against a front ledge of the chute to be available to the attendant within the serving booth or kitchen 11. The chute 54 is supported by brackets 55 upon one wall of the serving booth or kitchen 11.

Movable portières are suspended from the receiving members 52 to hide from view the lower conveyor 18 and more particularly the soiled dishes and utensils on the lower conveyor 18. These portières comprise adjacent depending wire members 56 which have their top ends 57 bent around L-shaped supporting brackets 58. More specifically, the top ends 57 of the wire members are bent around one arm of the L-shaped supporting brackets 58 between spaced flanges 59 formed on the said arm. The other arm of the L-shaped supporting brackets are formed with screw threads and are threadedly engaged into the bottom face of the receiving members 52 as shown in Figs. 4 and 5. Normally, the wire members 56 depend freely from their supporting brackets 58; however, they can be swung inwards to permit the soiled dishes and utensils to be placed on the bottom conveyor 18 to be carried into the serving booth or kitchen 11.

Mounted on the top face of the top conveyor 17 at spaced points therealong are vertically extending standards 60. These standards move with the top conveyor 17 and within the serving booth or kitchen 11, the attendant after placing a given order on the top conveyor 17 adjacent one of the standards 60 mounts an indicator 61, see Figs. 1, 11 and 12, on that standard to indicate the seat number to which the particular order belongs. The indicators 61 are preferably formed of wood and have an opening 62 extended in from one side thereof to receive the top end of the standard 60. The sides of the indicator 61 have painted thereon numbers corresponding to one of the seat numbers 43. The attendant within the serving booth or kitchen 11 has an indicator 61 for each of the eating areas of the table portions or counters 13.

At one point the serving table is formed with an underpass 63, see Fig. 1, beneath which the guests must pass to be seated on the inner side of the circle. In the vicinity of the underpass 63, the portions of the conveyors 17 and 18 are covered by a tubular member 64. If desired, so that the guests will not have to stoop too low to pass through the underpass 63, a portion of the floor beneath the underpass can be lowered forming a ramp 65, as shown in Fig. 1, to permit guests to pass more easily beneath the underpass.

The operation of the food server of the present invention is as follows:

A guest desiring to eat chooses a desired eating area at the table portions or counters 13 and sits on the adjacent stool 16. If the chosen eating area is inside the circle, the guest must pass through the underpass 63. The guest then removes the menu card 46 from its supporting bracket 45 and marks his seat number in the space 47. On the face of the card, he then indicates the food articles which he wishes to order, enters the amount of his order in the space 48 and places the money in payment for his order in the transparent envelope 49 on the back face of the menu card.

The menu card 46 is then placed in the space between the adjacent edge of the top conveyor 17 and the strip 50 to rest on the receiving member 52 to be carried by the rotating conveyor 17 into the serving booth or kitchen 11 where the card 46 will drop into the chute 54. The attendant within the serving booth or kitchen 11 takes the card from the chute 54, notes the food articles ordered and checks the amount entered in the space 48 and sees if the proper amount of money has been placed in the transparent envelope 49 on the reverse side of the menu card 46. If the charge and the payment tally, the attendant then places the ordered food articles on the top conveyor 17 adjacent one of the standards 60 and mounts an indicator 61, carrying a number corresponding to the seat number indicated on the menu card 46, on the top of the said adjacent standard. The conveyor rotates carrying the food articles from the serving booth or kitchen 11 around until the food articles reach a position in front of the guest who ordered them. The guest then moves his switch 44 to the "off" position thus stopping rotation of the conveyors 17 and 18 with his food articles in front of him, removes the food articles and places them on the eating area of the table portion or counter 13 in front of him, turns the switch 44 to the "on" position and then eats his meal.

Upon finishing his meal, the guest places the soiled dishes and utensils on the lower conveyor 18, through the movable portière and leaves the restaurant. The lower conveyor 18 will carry the soiled dishes and utensils into the serving booth or kitchen 11 where the sweeper member 38 will sweep them onto the moving belt 33 to be carried to the dishwashing station. The procedure is followed for each guest.

While the serving table is shown as being round on the accompanying drawings, it is pointed out that this is by way of illustration only, and that the table could be formed in other shapes.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a device of the class described, a circular base, superimposed conveyors mounted on said base, means associated with said conveyors concealing one of them, means rotatively supporting said conveyors, racks formed on the adjacent inner faces of said conveyors, a large gear between said conveyors and meshing with said racks, and means for driving said large gear to turn said conveyors in opposite directions.

2. In a device of the class described, a circular base, superimposed conveyors mounted on said base, means associated with said conveyors concealing one of them, means rotatively supporting said conveyors, and means comprising a large gear mounted between said conveyors for rotating said conveyors in opposite directions, and means for moving articles carried by the lowermost of said superimposed conveyors off that conveyor at one point in its path of movement, said article removing means comprising a moving belt extending radially from said lowermost conveyor at the said one point, and a rotative sweeper member for pushing the articles off said lowermost conveyor and onto said belt, said rotative sweeper member being driven by said means for rotating said conveyors.

3. In a device of the class described, a circular base, superimposed conveyors mounted on said base, means associated with said conveyors concealing one of them, means rotatively supporting said conveyors, means comprising a large gear mounted between said conveyors for rotating said conveyors in opposite directions, and means for moving articles carried by the lowermost of said superimposed conveyors off that conveyor at one point in its path of movement, said article removing means comprising a moving belt extending radially from said lowermost conveyor at the said one point, and a rotative sweeper member for pushing the articles off said lowermost conveyor and onto said belt, said rotative sweeper member being driven by said means for rotating said conveyors, said sweeper member comprising a vertical shaft rotatively supported at the outer periphery of said lower conveyor and adjacent one side of said belt, a hub fixed to said vertical shaft, and blades extended radially from said hub to push dishes off said lower conveyor and onto said belt as said shaft rotates.

4. In a device of the class described, a circular base, superimposed conveyors mounted on said base, means associated with said conveyors concealing one of them, means rotatively supporting said conveyors, means comprising a large gear mounted between said conveyors for rotating said conveyors in opposite directions, and means for moving articles carried by the lowermost of said superimposed conveyors off that conveyor at one point in its path of movement, said article removing means comprising a moving belt extending radially from said lowermost conveyor at the said one point, and a rotative sweeper member for pushing the articles off said lowermost conveyor and onto said belt, said rotative sweeper member being driven by said means for rotating said conveyors, said sweeper member comprising a vertical shaft rotatively supported at the outer periphery of said lower conveyor and adjacent one side of said belt, a hub fixed to said vertical shaft, and blades extended radially from said hub to push dishes off said lower conveyor and onto said belt as said shaft rotates, said drive for said sweeper member comprising a gear mounted on the top end of said shaft, and a second gear driven by said conveyor rotating means and meshing with said first gear.

WINTON L. SPRINGER.

References Cited in the file of this patent

UNITED STATES PATENTS

| Number | Name | Date |
|---|---|---|
| 271,678 | Atwood | Feb. 6, 1883 |
| 630,453 | Fairbanks | Aug. 8, 1899 |
| 1,331,947 | Stone | Feb. 24, 1920 |
| 1,358,230 | Miller | Nov. 9, 1920 |
| 1,382,354 | Greenberg | June 21, 1921 |
| 1,385,281 | Smiley | July 19, 1921 |
| 1,442,211 | Baitinger | Jan. 16, 1923 |
| 1,450,434 | Doerfler | Apr. 3, 1923 |
| 1,519,394 | Brooks | Dec. 16, 1924 |
| 1,688,551 | Nix et al. | Oct. 23, 1928 |
| 1,699,511 | Kendall | Jan. 15, 1929 |
| 1,809,951 | Vilfordi | June 16, 1931 |
| 1,822,288 | Harkey | Sept. 8, 1931 |
| 1,831,107 | Hall | Nov. 10, 1931 |
| 1,865,596 | Starks | July 5, 1932 |
| 1,916,521 | Marros | July 4, 1933 |
| 1,949,468 | Hackett | Mar. 6, 1934 |
| 2,037,815 | Ora | Apr. 21, 1936 |

FOREIGN PATENTS

| Number | Country | Date |
|---|---|---|
| 18,274 | Great Britain | Sept. 9, 1905 |